United States Patent [19]
Holmes et al.

[11] Patent Number: 5,483,363
[45] Date of Patent: Jan. 9, 1996

[54] SECURITY DEVICE

[75] Inventors: Brian W. Holmes, Middlesex; Kenneth J. Drinkwater, London; David Ezra, Oxon, all of England; Jon Andreassen, Berlin, Germany

[73] Assignee: De La Rue Holographics Limited, London, England

[21] Appl. No.: 984,586

[22] PCT Filed: Sep. 6, 1991

[86] PCT No.: PCT/GB91/01525

§ 371 Date: Jul. 15, 1993

§ 102(e) Date: Jul. 15, 1993

[87] PCT Pub. No.: WO92/04692

PCT Pub. Date: Mar. 19, 1992

[30] Foreign Application Priority Data

Sep. 10, 1990 [GB] United Kingdom ............... 9019784

[51] Int. Cl.[6] ..................................................... G03H 1/00
[52] U.S. Cl. ........................... 359/2; 359/22; 359/24; 359/25; 283/86; 283/93
[58] Field of Search ....................... 359/1, 2, 10, 22, 359/24, 25; 283/85, 86, 93

[56] References Cited

U.S. PATENT DOCUMENTS

| 3,542,448 | 11/1970 | Reynolds et al. | |
|---|---|---|---|
| 3,894,756 | 7/1975 | Ward | 359/2 |
| 4,140,373 | 2/1979 | Rüll | 283/86 |
| 4,184,700 | 1/1980 | Greenaway | 283/6 |
| 4,269,473 | 5/1981 | Flothmann et al. | 283/86 |
| 4,544,266 | 10/1985 | Antes | 283/85 |
| 4,761,543 | 8/1988 | Hayden | 235/457 |
| 5,026,132 | 6/1991 | Dausmann | 359/30 |
| 5,306,899 | 4/1994 | Marom et al. | 359/2 |
| 5,319,476 | 6/1994 | Yamazaki et al. | 359/2 |
| 5,422,744 | 6/1995 | Katz et al. | 359/2 |

FOREIGN PATENT DOCUMENTS

| 0004559 | 10/1979 | European Pat. Off. | G03H 1/00 |
|---|---|---|---|
| 0077917 | 5/1983 | European Pat. Off. | G07D 7/00 |
| 0132724 | 2/1985 | European Pat. Off. | G03H 1/04 |
| 2840556 | 3/1980 | Germany | G11B 7/00 |
| 2016775 | 9/1979 | United Kingdom | G06K 7/10 |

OTHER PUBLICATIONS

R. J. Collier, et al., *Optical Holography*, Academic Press, New York, pp. 280–292, 1971.

Dobrowolski et al.; "Research on Thin Film Anticounterfeiting Coatings at the National Research Council of Canada"; Applied Optics, vol. 28, No. 14, Jul. 15, 1989; pp. 2702–2717.

*Primary Examiner*—Paul M. Dzierzynski
*Assistant Examiner*—John Juba, Jr.
*Attorney, Agent, or Firm*—Oliff & Berridge

[57] ABSTRACT

A security device includes first and second diffractive structures contained within a surface relief structure. The structures are such that the device responds to illumination at a first, visible wavelength to generate a first, visible pattern while any pattern generated by the second structure is not substantially visible at that wavelength, and the device responds to illumination at a second wavelength substantially different from the first wavelength to generate a second pattern suitable for machine reading while any pattern generated by the first structure is substantially suppressed relative to the machine readable pattern at that wavelength.

19 Claims, 3 Drawing Sheets

SECURITY DEVICE

BACKGROUND OF THE INVENTION

The invention relates to security devices, methods for constructing such devices, and methods and apparatus for authenticating the devices.

Security devices such as holograms and diffraction gratings have become well known for protecting identification articles such as credit cards and the like.

A typical example is described in U.S. Pat. No. 4,269,473 in which a hologram is incorporated into a layer of an identification card. In this case the hologram includes machine readable characters as well as a visual representation of the other features of the card.

U.S. Pat. No. 4,184,700 describes the provision of a relief structure on a thermoplastic coating of an identification card or document which responds to incident, visible light to generate an interference pattern.

U.S. Pat. No. 4,544,266 describes a special diffraction pattern which is provided on an identity card or the like, the pattern comprising for example a hologram or diffraction grating. The diffraction pattern will diffract light at different wavelengths in different directions and this is used to provide an indication of whether a security device under test is authentic.

U.S. Pat. No. 3,542,448 discloses the recording of a number of holograms in different sub-areas of a storage medium so that upon exposure to light, coded information within the holograms can be determined.

GB-A-2016775 describes the provision of two optical markings on a substrate which cause a reading light be to deflected in different directions.

U.S. Pat. No. 4,140,373 describes a composite hologram which generates two machine readable codes which can be read at respective, different wavelengths. This suffers from the disadvantage that the existence of machine readable information is readily apparent and thus is likely to be fraudulently copied.

SUMMARY OF THE PRESENT INVENTION

There is a continuing need to increase the security of devices of this type and in accordance with a first aspect of the present invention, we provide a security device comprising first and second diffractive structures contained within a surface relief structure, the structures being such that the device responds to illumination at a first, visible wavelength, by a white light source to generate a first, visible pattern while any pattern generated by the second structure is not substantially visible at that wavelength, and that the device responds to illumination at a second wavelength substantially different from the first wavelength to generate a second pattern suitable for machine reading while any pattern generated by the first structure is substantially suppressed.

This new security device involves the provision of first and second diffractive patterns to form a composite structure, which patterns are individually generated (eg. reconstructed) upon illumination at two different wavelengths and alternately predominate depending upon the wavelength of the incident radiation used for reconstruction of the images.

This device appears to the normal observer to be conventional in that the first pattern is visible (ie. human readable) upon normal illumination. It has enhanced security not only because of the presence of the second structure but also because the machine readable pattern is not apparent upon illumination with the first wavelength.

Typically, at the second wavelength the first structure pattern is angularly or spatially separated from the first pattern.

The patterns may be fully superposed (ie. added to form a single, combined relief structure), partially overlap, or be positioned side by side.

In one example, the second wavelength may comprise infra-red radiation and the first wavelength is a band of white light. The references to illumination at the second wavelength includes illumination at a wavelength band. In this context, visible wavelengths are regarded as lying in the range 400 nm to 700 nm. Usually, the second wavelength will be longer than the first and preferably will lie in the infrared range, particularly the near infrared. Typical wavelengths for the second wavelength will be in the range 701 to 1000 nm, preferably 850 to 950 nm.

In the preferred example, a wavelength of about 950 nm will be used with a small band of radiation centred around that value. Alternatively, an even narrower band such as generated by a laser for example a solid state laser diode could be used.

Effectively, this new security device enables the second pattern to be substantially concealed from the user of a security printed document, card or other substrate on or verifiably within which the device is provided. This concealment can be enhanced at the first wavelength if the second pattern has a lower brightness than the first pattern (eg. less than 20%), or is at a substantially different angle, or is reconstructed at a different distance from the first.

One example of the first structure would be one which generates a "rainbow" (Benton) display hologram made by conventional embossing and metallising for visual authentication overlaid with a second structure for generating a weak machine readable diffraction grating or hologram, the second structure covering the entire area of the first and designed to be read at infra-red wavelengths. Upon illumination with white light a rainbow hologram will reconstruct to give an image banded with colour especially visible at the peak of the eye response (500–600 nm), the colour changes depending on the viewing angle.

Another method for concealing the second diffractive pattern upon irradiation at the first wavelength is to arrange for the image forming the second pattern to be formed (ie. reconstructed) much further from the device than the image from the first diffractive structure. Indeed, preferably the second reconstructed pattern is formed at a relatively far distance from the device, for example between 100 mm and 300 mm. This maximises the blur associated with the image generated by the second structure under white light viewing conditions due to chromatic aberrations resulting from dispersion. Typically in a visual rainbow hologram, image points greater than 50 mm from the image plane (ie. the surface of the device) become blurred due to chromatic aberrations because of dispersion. If the machine readable feature forms an image at points further, possibly much further, from the image plane than this (200 mm to 300 mm) then there will be a large degradation in the image formed of the machine readable feature under normal lighting conditions making visual detection of the machine readable feature very difficult.

Preferably, the first and second diffractive structures extend over substantially the same area of the device.

However, the rainbow hologram and machine readable feature could also occupy different regions of the device. For example the machine readable structure may be incorporated in part of a standard image hologram design, either added to it or surrounded by it.

A typical example would be a display hologram containing a visually verifiable and distinctive first image plus a concealed machine readable second image. This would be used as a security device for the authentication of documents, financial cards (such as credit cards, bank notes) or goods, by providing a brand protection label etc., as a security feature against counterfeiting and forgery with both visual and covert machine readable security. The device may also be incorporated in a passport, visa, identity card or license. Optionally the information in the machine readable image could vary from the visual image (e.g. batch encoded over a small number of variations) for use as an additional security feature for example for the decoding/verification of credit cards in ATMs (automatic teller machine).

The advantage of recording the second diffractive structure over the same area as the first is to prevent any particular area of the display image looking noticeably different or degraded and to enable the whole area of the security device to contribute to the second reconstructed pattern so increasing its relative brightness on readout.

It is also possible, however, by careful aesthetic design to include the white light hologram wholly or partly within the area having the machine readable diffraction pattern, or to confine the machine readable portion to a small area within or abutting the white light hologram. This can be disguised by good design.

The machine readable area will generally not be less than 1 square millimeter in area.

The hologram and the machine readable portion may abut. Thus for example a thin ribbon for exhibition on an authenticatable item may comprise adjacently embossed regularly repeating abutting hologram and machine readable diffraction pattern features.

While it is generally preferred that the two structures will at least overlap it is possible for the structure to be spaced by a small area of plain metal.

Commonly reconstructed images from both diffractive structures will be viewed by reflection in a conventional embossed hologram arrangement.

In another method the first and second diffractive structures are designed such that at the readout wavelengths of the second, machine verifiable structure (preferably near infrared wavelengths) the first order diffracted beam from the first diffractive structure is diffracted within the body of the device i.e. below the horizon (or plane) of the device. That is the first order diffraction angle is at least 90°. This means that the image generated from the first structure upon illumination at the second wavelengths effectively does not exist at these wavelengths, so considerably enhancing the signal to noise ratio on readout for the machine verifiable structure.

Furthermore, it enables the pattern generated from a very weak machine readable diffractive structure to be concealed by the reconstruction from the visual first diffractive structure upon illumination at the first wavelengths but yet to be reconstructible with good signal to noise ratio for machine verification at infrared wavelengths.

There are two main advantages in eliminating the reconstruction from the first pattern when illuminating at the second wavelength. Firstly, there is no angular overlap of the various reconstructed elements that constitute the first and second pattern generating structures so that, in the case of the first diffractive structure being a visual hologram, the "Benton" slits will vanish under the horizon, which leaves in principle an almost unrestricted angular space into which the second pattern can reconstruct a machine verification pattern. The second advantage follows from the fact that it is important to limit the amplitude of the second structure and therefore its diffraction efficiency or brightness so that in general the reconstruction from the second structure will be much weaker than that from the first to improve invisibility.

The first diffractive pattern can take a variety of forms of a conventional nature such as object holograms, two dimensional graphical diffraction effects, combined two and three dimensional graphical diffractive patterns, single or matrixed diffraction gratings, computer generated interference patterns, kinegrams, stereoholograms and the like. The term "hologram" is used generically to include these. White light viewable holograms of the rainbow or Benton types are preferred as the first diffractive structures. Preferably, diffractive devices are used which reconstruct to provide images which give a perception of depth, such as images of three dimensional objects, and graphical diffraction patterns which give the perception of there being a number of planes of depth on which images are represented.

The preferred types of three dimensional images will reconstruct to give the impression of the image being located at a position intersecting or close to the (physical) plane of the device. The image is perceived to be confined within parallel planes to the surface set at typically no greater than 50mm on either side of the true surface.

Such images which are being grouped under the generic name "holograms" may be created by holographic recording on an optical bench using a coherent laser light source. It is however possible to create simple diffracting patterns by mechanical ruling methods.

Alternatively diffractive patterns of a complex nature can be created by creating an instruction set in a computer which is then used to drive a fine electron beam which causes a surface relief pattern to be created on the resist coating exposed to the beam.

The second structure may also have a conventional form as above or it may consist of an image hologram of an out of plane image consisting of a coded pattern of discrete spots. For example, a set of image points forming a digital e.g. on/off pixel pattern is particularly useful. This image is simply formed by a series of diffracting beams emanating from the device on illumination and thus not necessarily having to reconstruct to form an image. In other words, the coded pattern can be regarded as a picture of a series of blocks. In this case an image of the blocks would be reconstructed. The alternative way is simply to create a set of beams which would diverge, these beams forming the coded pattern.

This machine readable pattern will generally be recorded on the holographic table while making a white light hologram.

In accordance with a second aspect of the present invention, a method of constructing a security device according to the first aspect of the invention comprises forming the first diffractive structure as a surface relief on a substrate; and forming the second diffractive structure as a surface relief in the same region of the substrate as the first structure. Both structures preferably combine to form a single surface relief pattern.

The first and second pattern generating structures may be formed simultaneously or sequentially.

For example, the manufacturing technique can utilise conventional holographic origination for display holograms preferably recorded onto photoresist which can then be used to form embossing shims for the mass production of embossed holograms. The final photoresist hologram or "H2" can be recorded by conventional transfer from one or more rainbow "H1" holograms to form the visual display image, plus exposure to either a diffusing target to give a pixel pattern, or whatever other form of machine verifiable image is desired. Thus, after recording of the first and second structures into a photoresist coating, the coating will be developed to provide the surface relief pattern which will eventually be used for embossing. This pattern will be electroformed into nickel and further replicas will be made for use on the embossing machine.

We refer to "embossing" but replication of the surface relief pattern could occur by using the polymerisation methods of replication well known for use with holograms.

After replication the transparent polymeric surface will be metallised such as with aluminium or another suitable metal. This metallisation may be full or partial. Partial metallisation may be through the use of a very thin but even coating of metal. Alternatively the creation of a halftone-like pattern of metal may be employed as known in the art.

As an alternative to metallisation after embossing it is possible to emboss a thinly metallised surface.

The polymeric surface which is embossed will generally be in the form of a plastic film or plastic coating supported on a substrate having a smooth surface. Lacquer coated paper, optionally containing release agents, maybe employed but generally the optical quality of the image is inferior to that found with smooth plastic film. This lacquer coated paper may be metallised after embossing and treated with a polymeric protective lacquer. Alternatively the lacquer may be metallised before embossing. Metallisation may be achieved by vapour or otherwise coating with a thin metallic layer such as aluminium, chromium or copper Alternatively, a thin layer of a different diffraction effect enhancing layer which has a refractive index different from that of the transparent polymeric material in use may be employed (such as described in U.S. Pat. No. 4,856,857).

Examples of such are:

Transparent continuous thin films having a greater refractive index than the polymeric material comprising the diffractively embossed surface such as titanium dioxide, zinc oxide, zirconium oxide, silicon oxide, magnesium oxide and the like.

Transparent strong dielectrics having a refractive index greater than that of the polymeric material such as barium titanate.

Transparent continuous thin films having a smaller refractive index than the polymeric material such as magnesium fluoride.

Organic polymeric coatings which have a significantly different refractive index to the polymeric materials such as poly vinyl butyryl, polyethylene, polyvinylchloride and the like.

In a preferred arrangement, the second structure is formed by exposing the substrate to a recording beam through an aberrating optical system.

This leads to an increase in security. If a set of, for example cylindrical or highly aberrated (but reproducible) optics or mirrors is used during the original recording a similar set of optics would be required within the reader to enable an image of the original machine readable feature to be formed by the (approximately) phase conjugate wave reconstructed. Without this matched set of optics only a highly aberrated unrecognisable image could be formed—thus providing an additional security feature. This would enable no useful information to be gained from an examination of the hologram alone and would further conceal the nature of the machine verifiable image. In particular this anticipates the object beam for the machine readable image being recorded through a known optical system, such as cylindrical lenses, spherical lenses, possibly with deliberate tilt aberrations or particular focus positions which could be reproduced by similar optics within the reader mechanism. Such a system could usefully overcome the previous problems of other phase conjugation systems proposed associated with the tight alignment tolerances needed to accurately phase conjugate through a highly aberrating medium (e.g. a diffusing scatterer). These would make practical application of such previous systems very difficult to achieve as any system would be extremely intolerant to small position and tilt errors likely to occur in real situations. This system would also allow a method of differentiating holograms in different readers intended for different applications simply by altering one parameter (possibly a lens position) within the optical system and would allow, if desired, readers to be simply matched to different hologram geometries by adjustments/positioning of the internal optics.

Instead of the holographic table origination the machine readable diffraction pattern could be created in the form of an instruction set in a computer. That set would then be used to drive an electron beam. In this case the machine readable diffraction pattern could be added to the computer generated holographic image and this presented in all pixels or a selected subset. Alternatively the machine readable pattern could be presented in a specified set of pixels intersecting the display image without any scanned image content being present in these readable pixels.

Although only one machine readable structure will normally be used, more than one machine readable structure could be recorded in the device, for example with one half of the embossed area forming the white light hologram containing the first machine readable data and the other half the other. These two machine readable features would be arranged to be read at substantially different angles.

The substrate will typically comprise a plastics such as embossable transparent polyethylene, polypropylene, acrylic or other polymer coated (releasably or otherwise) polyester, and polyvinyl chloride. The plastics may be tinted. Printing may be applied at the embossed interface.

The embossed substrates may be adhesive backed such as with pressure sensitive adhesives or hot stampable adhesives. Care must be taken during hot stamping to ensure that the machine readable image quality is not significantly deteriorated as it will generally provide a weaker signal.

The finished devices may be used in their own right such as in passport visas where they may comprise essentially the whole article or they may be affixed to or otherwise incorporated into authenticatable items. For example the device may be presented in the form of a label. Alternatively it may be incorporated as a windowed thread in a security paper. Alternatively it may be presented as part of an adhesive film used for securing passport photographs to passports.

Examples of items which may incorporate the device are passports, passbooks, tickets, permits, licenses, financial transaction cards including cheque guarantee cards, charge cards, credit cards, cash withdrawal cards, electronic funds transfer cards, service entitlement cards, personal or article identification cards, prepayment cards, telephone cards, variable e.g. decrementing value cards, bonds, fiscal documents, bank notes, cheques including travellers cheques, vouchers, brand identification labels, tamper resisting or indicating labels.

In accordance with a third aspect of the present invention, a method of authenticating a security device according to the first aspect of the invention or manufactured in accordance with the second aspect of the invention comprises illuminating the device at the second wavelength; detecting the pattern generated by the second structure; and analysing this pattern by comparison with a reference.

In the case where the pattern generated by the second structure is a coded pattern of discrete spots, the analysis step may comprise determining the relative intensities of the detected spots. It is useful to measure the relative intensities of different portions of the reconstructed machine verifiable image (for example as a 3 level [2,1,0] coding scheme) as an additional check on security or as an additional coding means as opposed to measuring the absolute reconstruction efficiency of the machine readable feature which could vary due to emboss fidelity and substrate flatness, etc. So in particular a relative intensity variation could be encoded into the machine verifiable image spots as an additional security encoding feature.

In accordance with a fourth aspect of the present invention, apparatus for authenticating a security device according to the first aspect of the invention or manufactured in accordance with the second aspect of the invention comprises illumination means for illuminating the device at the second wavelength (preferably in the near infrared); detection means for detecting the resultant (image or pixel) pattern generated by the second structure; and processing means for analysing the detected pattern by comparison with a reference.

In the case where the second structure has been formed by exposing the substrate to a recording beam through an aberrating optical system, the apparatus further comprises a compensating optical system between the device and the detection means to remove the effects of the aberrating optical system.

Thus, in one example the apparatus will comprise

A) a narrow band (near infrared) light source which illuminates the device with a suitably angled narrow beam;

B) locating means for locating the device such that the illumination beam impinges onto the machine readable feature area in the device;

C) sensing means for sensing the resulting diffracted pattern which generates sensed data;

D) comparison means for comparing the sensed data with reference data; and

E) means for outputting a signal in accordance with the result of the comparison.

The sensing means may be in the form of an array of individual sensors spatially disposed in accordance with the diffracted signal expected from a valid device. For example there may be an array of silicon photosensors each capable of providing a signal indicating at least whether there is a diffracted beam or not (or level or intensity of the diffracted beams). Such a two dimensional sensing array may take an eight by four format.

Alternatively a line of sensors may be provided to allow the document to be scanned past it.

The sensing means may employ a charge coupled device which may be used to record coded blocks, or it may record a complicated image.

Resulting from the sensing will typically be a set of presented device data which will then be matched with data held by or accessible to the comparing microprocessor.

The data representing the degree of matching in accordance with the preset instructions may be used to drive electronic equipment such as pass and fail lights or displays, sounders, cameras, marking equipment, electronically controlled doors, conveyor deflectors and the like.

The authenticating equipment may be used on its own for example giving a pass or fail signal or it may be incorporated into cash, ticket and voucher accepting, sorting and-or dispensing equipment, and access control equipment.

BRIEF DESCRIPTION OF THE DRAWINGS

Some examples of security devices, methods for making such devices and methods and apparatus for reading the devices will now be described with reference to the accompanying drawings, in which.

DETAILED DESCRIPTION OF PREFERRED EMBODIMENTS

Figure 1:
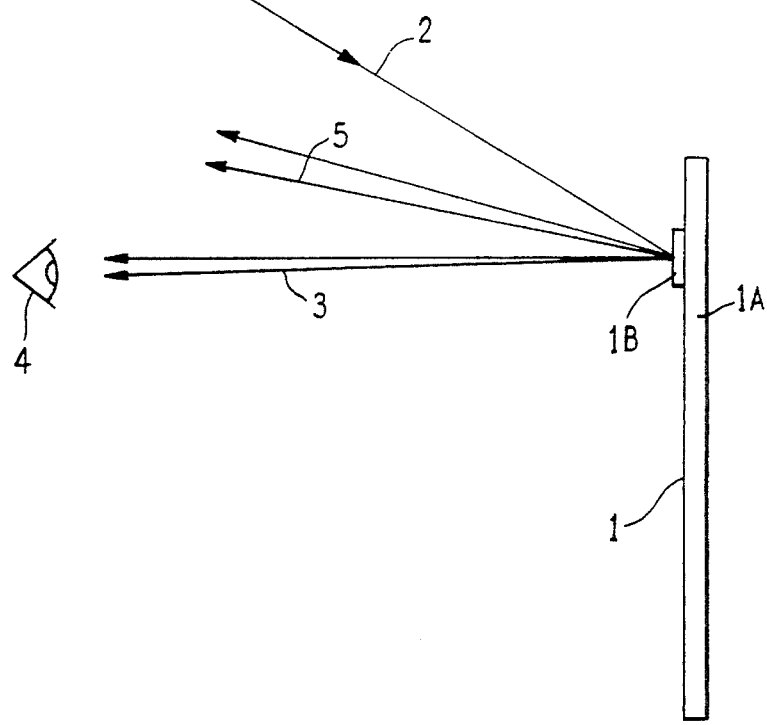
FIG. 1 illustrates a first example of a device while exposed to white light.

FIG. 1 illustrates a sectional view of a laminated credit card 1 comprising a security printed, personalised plastics substrate 1A which bears a device 1B of the invention, in the form of a securely affixed label. The device 1B comprises a transparent plastics substrate having a diffracting inner surface (the diffraction resulting from an impressed relief pattern), which has been metallised and the metallic surface then laminated to the card surface. The net diffractive embossment comprises two superimposed diffractive patterns, visual and machine readable respectively, combined during the origination stage, which provide a white light viewable display hologram and infrared responsive machine readable information.

Under white light illumination 2, the device generates a first reconstructed pattern defining an image which is perceived to be close to the real plane of the device (as distinct from appearing to be distantly above or below the surface of the device). This reconstructed image is formed by diffracted beams 3 which give the perception to the viewer 4, of typically a three dimensional object.

The image perceived at 4 is kept sharp but is restricted in perceived position and depth within a relatively shallow distance above and below the surface of the device, typically less than 50 mm.

The machine readable feature incorporated in the composite hologram is reconstructed by the white light 2 such that the image forms well out of the plane of the card 1, typically between 50 mm and 300 mm away so that it exhibits a degree of blur due to chromatic aberration. The net effect of this is that the machine readable image which would theoretically be viewable in white light as a result of reconstruction beams 5 is not readily noticeable.

Figure 2:
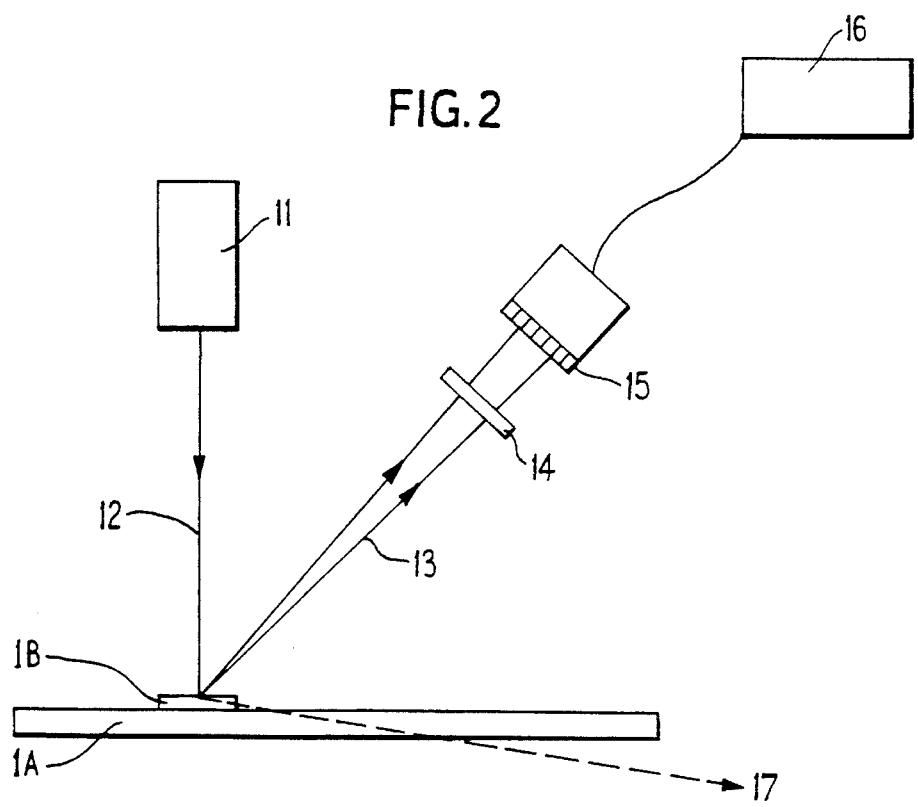
FIG. 2 illustrates apparatus for reading the machine readable pattern reconstructed by the device shown in FIG. 1.

FIG. 2 illustrates the apparatus needed to reconstruct or form the machine readable pattern arising from the second diffractive structure. A solid state device 11 such as an infrared emitting diode or a laser diode which preferably emits narrow band near infrared radiation, typically around 950nm is collimated or focused (not shown) in such a way as to provide a beam 12 which impinges on the composite device 1B mounted on the substrate 1A. Under illumination at this wavelength, the second pattern generating structure responds to the incoming beam to reproduce the machine readable pattern which is in the form of a set of pixels having on or off status (to be described in more detail below), the beams 13 generated by the second structure being focused at 14 onto one or more photodetectors (or a CCD array) 15. Each photodetector corresponds to a pixel of the resultant machine readable image and generates an electrical signal representing the intensity of the incoming beam. These electrical signals are fed to processing electronics 16 of conventional form which compares the detected pattern with a reference and indicates whether or not the two patterns are the same.

The first diffractive structure also responds to the infrared beam 12 but by selecting the reference to object beam angle of the first diffractive structure (display hologram) and the second diffractive structure (machine readable hologram) it is possible to arrange that at the infrared readout wavelength, the diffraction angle of the first order display hologram is greater than 90° so that the "reconstructed" beam 17 becomes evanescent and does not exist. This increases signal to noise ratio for the machine readable pattern.

As has been mentioned above, the composite hologram could be created by exposing a light responsive surface on the substrate through an aberrated optical system. In that case, the machine readable apparatus will further comprise a de-aberrating optical system (not shown) through which the reconstructed beams 14 pass before impinging on detectors 15.

Figure 3:
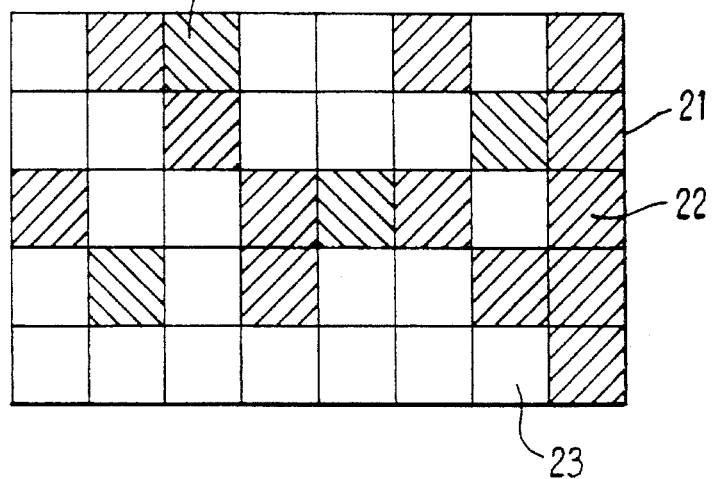
FIG. 3 illustrates an example of a machine readable pattern.

FIG. 3 illustrates a typical pixel pattern forming a machine readable pattern. This pattern, as shown at 21 can be an array of output spots forming an on/off pattern, bar code and the like or could optionally be well separated spots or just one spot for verification. In this particular example, a rectangular array of spots is shown with pixels 22 being "off" as indicated by the hatched lines; pixels 23 being "on"; and some pixels 24 having an intermediate (grey scale) value which could be used to provide additional encoding in accordance with the brightness levels.

To produce the diffractive structure which will reconstruct such a machine readable pattern, the origination target could be a masked diffuser or set of diffusers.

To detect this pattern the photodetectors 15 or CCD array will be arranged in a similar manner to the squares or pixels shown in FIG. 3.

Figure 4:
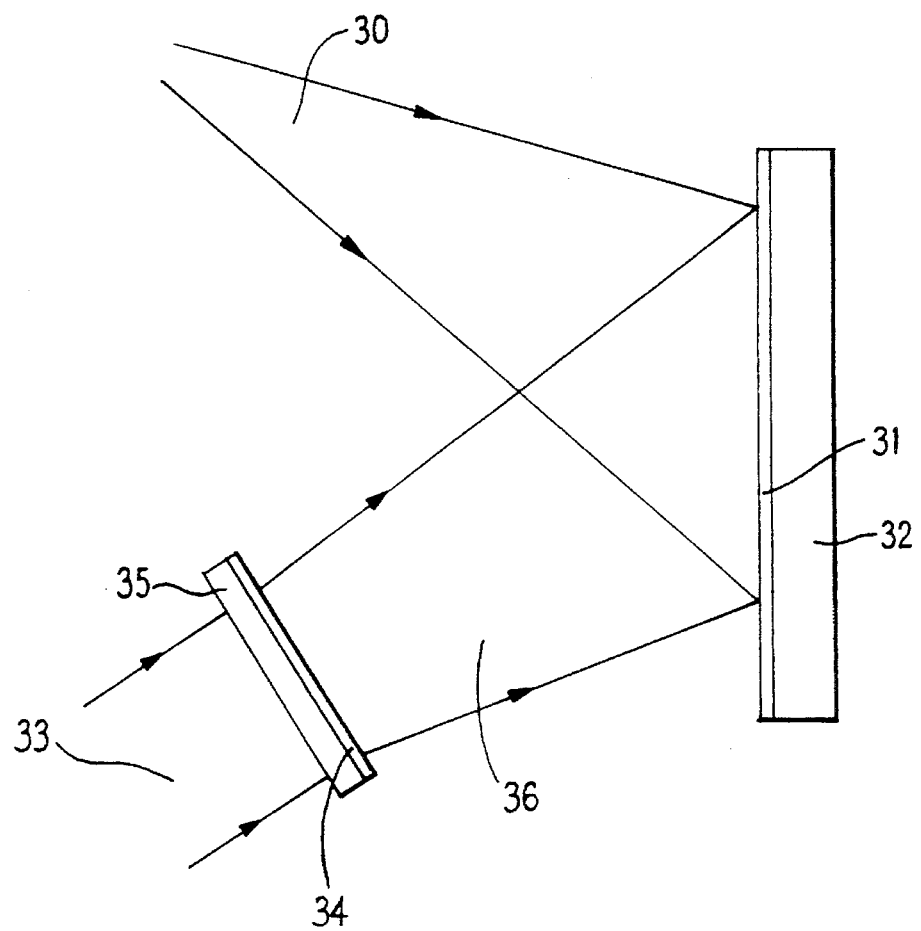
FIGS. 4 and 5 illustrate apparatus for recording the first and second diffractive structures respectively.
Figure 5:
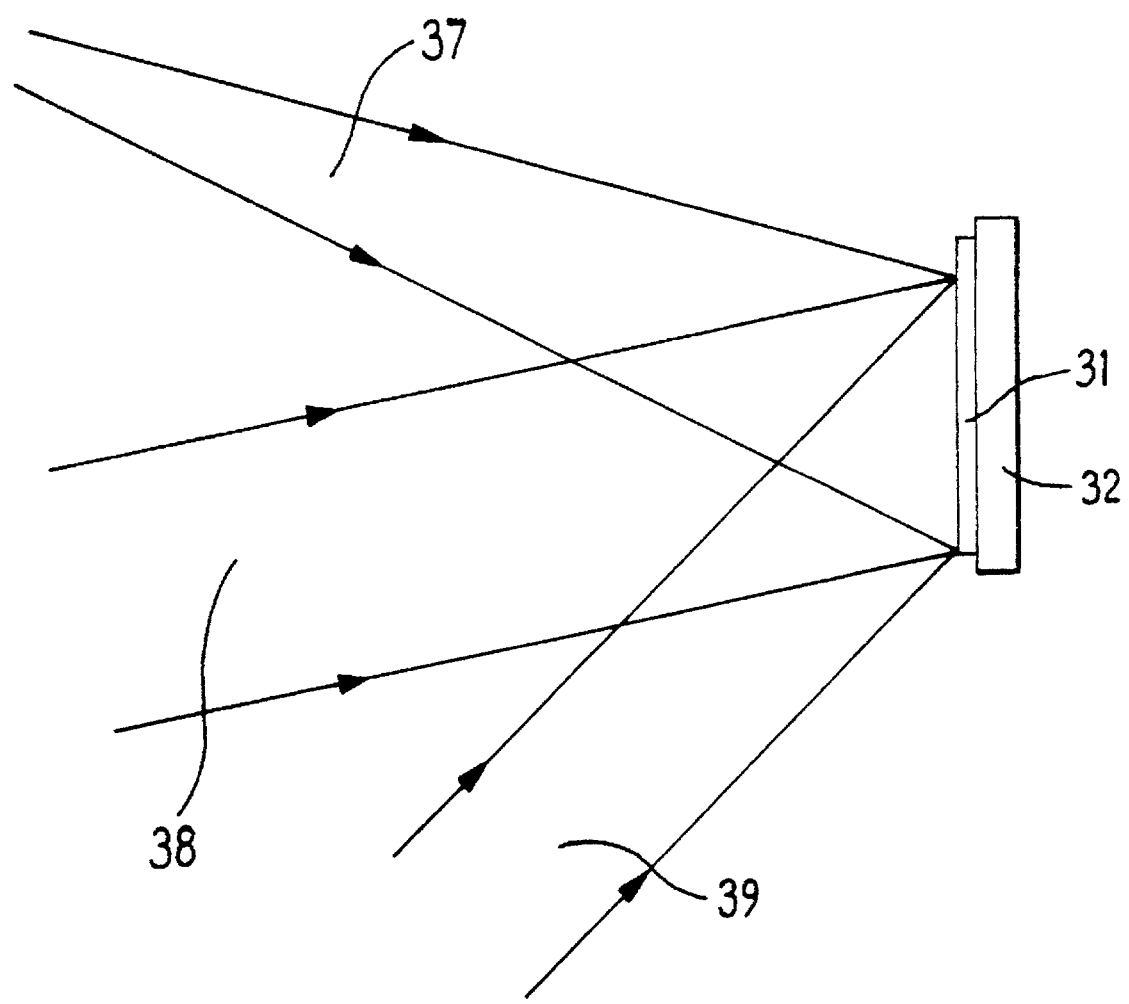

FIGS. 4 and 5 illustrate a two step, optical bench manufacturing method used for recording both a standard display hologram as the first diffractive structure and on top of that the second machine readable diffractive structure in a recording medium such as a photoresist.

This involves the first step of exposing a photoresist coated glass plate to form a standard rainbow holographic image as known in the art.

This is followed by recording on the photoresist the machine readable diffraction pattern.

FIG. 4 shows an illustrative layout for recording a display hologram. A beam of appropriate laser light is split. One part forms a collimated or near collimated reference beam 30 which plays on a photoresist coating 31 mounted on a glass plate 32. The other part 33 of the beam is caused to illuminate the rear of a master (usually termed "H1") rainbow hologram (which is a transmission hologram recorded in a gelatino silver halide emulsion 34 supported on as glass plate 35, which has been developed). The diffracted light beam 36 reconstructs a real image in the plane of the photoresist plate, interfering with the reference beam.

The display hologram of the first diffractive structure is formed by recording the interference pattern formed between the object and reference beams, as known in the art.

FIG. 5 illustrates the layout needed on the optical bench for the recording of the second diffractive structure. This is done by placing the photoresist coating exposed in the manner of FIG. 4 before development.

The photoresist coating 31 is exposed to a collimated reference beam 37 and several object beams 38 and 39, each of which interferes with the reference beam to form simple sinusoidal gratings superimposed on the display hologram. Each of these gratings corresponds to one element of the machine readable feature.

Alternatively the coded object beams could be derived from small point sources or small area sources in which case the machine readable features would contain a greater range of spatial frequencies. The advantage of recording the machine readable feature as a set of overlaid gratings is the reduction of fringe competition in the medium allowing a brighter display image and machine readable image to be observed. In all cases the relative energies of the exposures are balanced to obtain the derived result.

The machine readable structure will typically be recorded at a small angle-to the reference beam 37 (ie preferably but not necessarily the same reference beam angle as the visual image and with a small angle between the object beam and reference beam in order to make the feature more difficult to view). The angle between the machine readable object beam and reference beam should be smaller than that between the visual hologram object beams (conventionally the angle subtended by the Benton or rainbow slits of the hologram) and the reference beams in order to aid concealment. It should be noted that the reference beam for the machine readable pattern could have a different divergence/convergence to that used for the visual hologram.

The white light incident on the device is preferably angularly incident from a discrete source rather than diffusely incident.

The second illumination source may be a narrow band source, say, of 50 mm bandwidth or less and must emit at a wavelength substantially different from that of the first source. The second source is preferably a narrow band near infrared source such as is emitted from an infrared emitting diode and is preferably incident on the device as a single narrow width beam.

What is claimed is:

1. A security device comprising first and second diffractive structures contained within a surface relief structure, the surface relief structure being responsive to illumination at a first, visible wavelength, by a white light source, to generate a first, visible pattern, wherein all patterns generated by the second diffractive structure are not substantially visible at the first wavelength, and the surface relief structure being responsive to illumination at a second wavelength substantially different from the first wavelength to generate a second pattern suitable for machine reading, all patterns generated by the first diffractive structure being substantially Suppressed at the second wavelength, wherein upon illumination at the second wavelength, all patterns generated by the first diffractive structure are diffracted under the horizon of the security device.

2. A device according to claim 1, wherein the first and second structures are superposed.

3. A device according to claim 2, wherein the first and second diffractive structures extend over substantially the same area of the device.

4. A device according to claim 1, wherein the second pattern is a coded pattern of discrete spots.

5. A device according to claim 1, wherein the first diffractive structure is a "rainbow" hologram.

6. A device according to claim 1, wherein the second generated pattern has a significantly lower brightness than the first generated pattern upon illumination by the white light source.

7. The security printed document having a security device of claim 1.

8. A document according to claim 7, wherein the document is a passport.

9. The device according to claim 1, wherein the first diffractive structure is formed as a surface relief on a substrate and the second diffractive structure is formed as a surface relief in the same region of the substrate as the first structure.

10. The device according to claim 9, wherein the first and second diffractive structures are formed substantially simultaneously.

11. The device according to claim 9, wherein the second structure is formed by exposing the substrate to a recording beam through an aberrating optical system.

12. The device according to claim 9, wherein the structures are combined to form a single relief pattern.

13. A substrate carrying a photoresist surface bearing the surface relief structure in the security device of claim 11.

14. A security device comprising first and second diffractive structures contained within a surface relief structure, the surface relief structure being responsive to illumination at a first, visible wavelength, by a white light source, to generate a first, visible pattern, wherein all patterns generated by the second diffractive structure are not substantially visible at the first wavelength, and the surface relief structure being responsive to illumination at a second wavelength substantially different from the first wavelength to generate a second pattern suitable for machine reading, all patterns generated by the first diffractive structure being substantially suppressed at the second wavelength, wherein upon illumination by the white light source, the pattern generated by the second diffractive structure is positioned angularly close to the direction of propagation of the illumination by the white light source and is thereby obscured from view.

15. A security device comprising first and second diffractive structures contained within a surface relief structure, the surface relief structure being responsive to illumination at a first, visible wavelength, by a white light source, to generate a first, visible pattern, wherein all patterns generated by the second diffractive structure are not substantially visible at the first wavelength, and the surface relief structure being responsive to illumination at a second wavelength substantially different from the first wavelength to generate a second pattern suitable for machine reading, all patterns generated by the first diffractive structure being substantially suppressed at the second wavelength, wherein the second generated pattern is formed at a greater distance from the device than the first generated pattern upon illumination by the white light source.

16. A device according to claim 15, wherein the second generated pattern is generated at a distance of between 50 mm and 300 mm from the device.

17. Apparatus for authenticating a security device comprising first and second diffractive structures contained within a surface relief structure, the surface relief structure being responsive to illumination at a first, visible wavelength, by a white light source, to generate a first, visible pattern, wherein all patterns generated by the second diffractive structure are not substantially visible at the first wavelength, and the surface relief structure being responsive to illumination at a second wavelength substantially different from the first wavelength to generate a second pattern suitable for machine reading, wherein all patterns generated by the first diffractive structure are substantially suppressed at the second wavelength, the authenticating apparatus comprising illumination means for illuminating the device at the second wavelength; detection means for detecting the resultant pattern generated by the second diffractive structure; and processing means for analyzing the detected pattern by comparison with a reference, wherein the illuminating means also includes means for illuminating the device with a white light source so that the pattern generated by the first diffractive structure may be viewed.

18. Apparatus according to claim 17, wherein the illuminating means is controllable to illuminate the device with the white light source or at the second wavelength.

19. Apparatus according to claim 17, wherein the first diffractive structure is a rainbow hologram.

* * * * *